(12) United States Patent 
Farrokhi (10) Patent No.: US 9,559,832 B2
(45) Date of Patent: Jan. 31, 2017

(54) POWER LINE COMMUNICATION SYSTEM SYNCHRONIZATION

(71) Applicant: EnVerv, Inc., Milpitas, CA (US)

(72) Inventor: Farrokh Farrokhi, San Ramon, CA (US)

(73) Assignee: Semtech EV, Inc., Camarillo, CA (US)

( * ) Notice: Subject to any disclaimer, the term of this patent is extended or adjusted under 35 U.S.C. 154(b) by 371 days.

(21) Appl. No.: 13/742,127

(22) Filed: Jan. 15, 2013

(65) Prior Publication Data

US 2014/0198859 A1 Jul. 17, 2014

(51) Int. Cl.
*H04L 7/00* (2006.01)
*H04B 3/54* (2006.01)

(52) U.S. Cl.
CPC .......... *H04L 7/0008* (2013.01); *H04B 3/542* (2013.01); *H04B 3/544* (2013.01)

(58) Field of Classification Search
CPC ........................................ H04B 3/52
USPC ................................................. 307/1
See application file for complete search history.

(56) References Cited

U.S. PATENT DOCUMENTS

| | | | | | |
|---|---|---|---|---|---|
| 4,468,792 | A | * | 8/1984 | Baker et al. | 375/272 |
| 4,556,864 | A | * | 12/1985 | Roy | 375/219 |
| 4,556,866 | A | * | 12/1985 | Gorecki | 375/272 |
| 4,864,589 | A | * | 9/1989 | Endo | 375/141 |
| 4,908,600 | A | * | 3/1990 | Martinez | 340/538.11 |
| 5,777,544 | A | * | 7/1998 | Vander Mey et al. | 370/465 |
| 6,101,214 | A | * | 8/2000 | Hershey et al. | 375/130 |
| 6,329,905 | B1 | * | 12/2001 | Cunningham | 375/273 |
| 6,549,120 | B1 | * | 4/2003 | de Buda | 370/482 |
| 7,012,505 | B1 | * | 3/2006 | Arden | 370/482 |
| 7,596,169 | B2 | * | 9/2009 | Sokolov et al. | 375/146 |
| 7,894,487 | B2 | * | 2/2011 | Yonge et al. | 370/509 |
| 8,750,395 | B1 | * | 6/2014 | Woodruff et al. | 375/259 |
| 2011/0007625 | A1 | * | 1/2011 | Kataoka | 370/208 |
| 2014/0089717 | A1 | * | 3/2014 | Alsup | 713/401 |

OTHER PUBLICATIONS

Enrico Rubiola, "On the Measurement of Frequency and of its Sample Variance with High-Resoluation Counters", May 2, 2005, Review of Scientific Instruments 76 (2005), pp. 054703-1 to 054703-6.*
International Preliminary Report on Patentability—PCT/US14/11514—IPEA/US—Mar. 27, 2015.
International Search Report and Written Opinion—PCT/US14/11514—ISA/US—May 8, 2014.
Rubiola, E. "On the Measurement of Frequency and of Its Sample Variance With High-Resolution Counters", Rev. Sci. Inst. May 2, 2005, vol. 76, 054703.
Neiman, K et al ,"Cyclic Spectral Analysis of Power Line Noise in the 3-200KHZ Band" Apr. 15, 2009.
Cypress Semiconductor, "What is Power Line Communication?" Aug. 17, 2011, EE Times.

* cited by examiner

*Primary Examiner* — Adi Amrany
(74) *Attorney, Agent, or Firm* — Muncy, Geissler, Olds & Lowe, P.C.

(57) ABSTRACT

Systems and methods for synchronizing a power line communication system including a power line and one or more devices communicatively coupled to the power line. A mains frequency of the power line is estimated at the devices, and corresponding local frequencies of the devices are adjusted based on the corresponding estimated mains frequency. Data signals are transmitted from or received by the devices based on the adjusted local frequencies.

9 Claims, 12 Drawing Sheets

POWER LINE COMMUNICATION SYSTEM SYNCHRONIZATION

FIELD OF DISCLOSURE

Disclosed embodiments are directed to synchronization in power line communication systems. More particularly, exemplary embodiments are directed to frequency synchronization of devices with mains frequency of power lines in power line communication systems.

BACKGROUND

Clock synchronization is an important aspect of communication systems. Conventional communication systems include one or more devices, such as modems, which are communicatively coupled via a network. The devices may have local clocks which may not be perfectly synchronized with one another or with the network. The variation in frequency due to lack of perfect synchronization may lead to communication errors and reduce accuracy and reliability of communication. For example, quality of communication, measured in terms of signal-to-noise ratio (SNR) may deteriorate. Existing solutions for improving synchronization in communication systems can involve synchronization signals received from external sources, such as global positioning systems (GPS). Known approaches can also involve the use of a network clock coupled to a network, such as, a fiber optic network, a cellular phone network, or a broadcast network. However, the known approaches for improving synchronization in communication systems suffer from several drawbacks, such as, high complexity in implementation, restricted availability of required resources, and often, prohibitively high costs.

A specific type of communication system known in the art is a power line communication (PLC) system. Typically, the devices in PLC systems are PLC modems. The PLC modems are communicatively coupled to a power distribution system or network. Each PLC modem has a local oscillator, which drives the local clock of the PLC modem. Variations may arise in frequencies of local oscillators in different PLC modems. For example, two local oscillators may differ in frequency to the order of +/−20 ppm. In order to provide a reliable communication, the frequencies of the receiver and the transmitter of a PLC modem need to be synchronized to one another. PLC systems possess several attractive features, such as, ease of availability and low cost. However, exposure to noise and interference from the various devices connected to the PLC system can pose severe problems to synchronization, particularly when it comes to receiver synchronization.

Accordingly, there is a need for improving synchronization in PLC systems. More specifically, there exists a need for low cost and efficient techniques for various aspects related to synchronizing devices, such as PLC modems, in PLC systems.

SUMMARY

Disclosed embodiments are directed to systems and methods for synchronizing a power line communication system including a power line and one or more devices communicatively coupled to the power line.

For example, an exemplary embodiment is directed to a method of synchronizing a power line communication system, the method comprising estimating a mains frequency of a power line at a device coupled to the power line, and adjusting a local frequency of the device based on the estimated mains frequency, to synchronize the device to the power line.

Another exemplary embodiment is directed to a power line communication system comprising a power line, a communication link, and a device coupled to the power line through the communication link. The power line communication system can further comprise logic configured to estimate a mains frequency of the power line at the device and adjust a local frequency of the device based on the estimated mains frequency.

Yet another exemplary embodiment is directed to power line communication system comprising: a power line, a device coupled to the power line through communication means, means for estimating a mains frequency of the power line at the device, and means for adjusting a local frequency of the device based on the estimated mains frequency.

A further exemplary embodiment is directed to non-transitory computer-readable storage medium comprising code, which, when executed by a processor, causes the processor to perform operations for synchronizing a power line communication system, the non-transitory computer-readable storage medium comprising code for estimating a mains frequency of a power line at a device coupled to the power line, and_code for adjusting a local frequency of the device based on the estimated mains frequency.

Accordingly, in one aspect, a mains frequency of the power line is estimated at the devices, and corresponding local frequencies of the devices are adjusted based on the corresponding estimated mains frequency. Data signals are transmitted from or received by the devices based on the adjusted local frequencies. In some embodiments, synchronizing data signals can be performed by digital resampling of transmitted and received signals, rather than by adjusting the local frequencies during transmission or reception. The estimated mains frequency may be calculated by measuring time between zero crossings of signals on the power line (or mains signals), or by using frequency estimation methods based on digital signal processing. The estimated frequency may be calculated for several points in time to obtain several samples of estimated mains frequency and the samples can be averaged over a period of time during which the samples were obtained. Averaging the samples can relate to simple averaging or weighted averaging. Weighted averaging comprises weighting the samples with a weight function and then calculating an average of the weighted samples. Example weight functions include exponential, square, and triangular weight functions.

The methods and systems disclosed herein may be implemented by any means for achieving various aspects, and may be executed in a form of a non-statutory computer-readable medium embodying a set of instructions that, when executed by a processor, cause the processor to perform any of the operations disclosed herein. Other features will be apparent from the accompanying drawings and from the detailed description that follows.

BRIEF DESCRIPTION OF THE DRAWINGS

The accompanying drawings are presented to aid in the description of embodiments of the invention and are provided solely for illustration of the embodiments and not limitation thereof.

Other features of the present embodiments will be apparent from the accompanying drawings and from the disclosure of the various embodiments.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. Furthermore, while certain embodiments may be described as embodied in an integrated circuit, embodiments are not limited to a single integrated circuit, but may pertain to a system with one or more integrated circuits. As such, exemplary embodiments may be embodied in a test chip or solutions such as a system on a chip (SoC). In addition, for each of the embodiments described herein, the corresponding form of any such embodiments may be described herein as, for example, "logic configured to" perform the described action.

Exemplary embodiments are directed to systems and methods for frequency synchronization in power line communication (PLC) systems.

Figure 1:
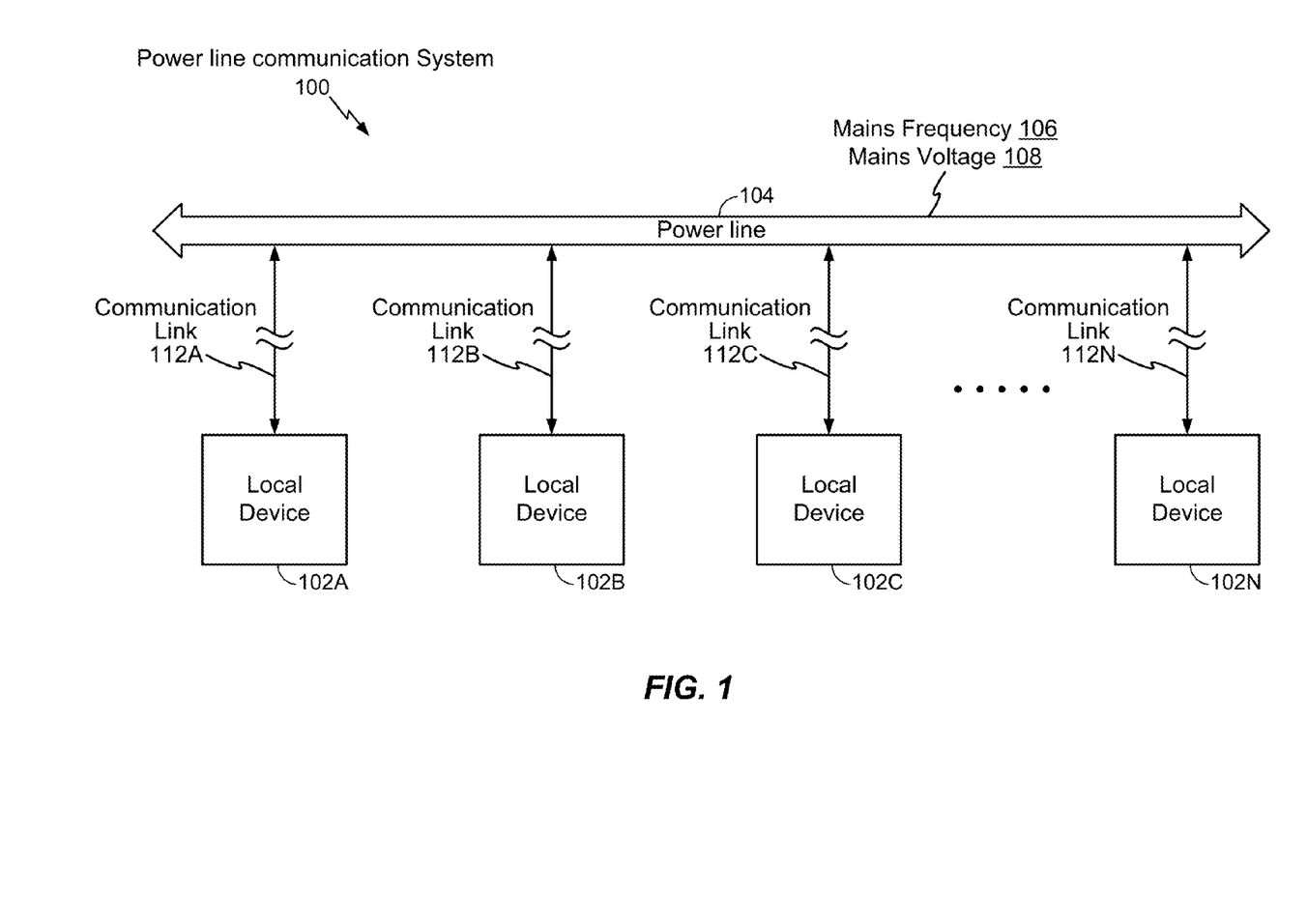
FIG. 1 illustrates an exemplary power line communication system

With reference to FIG. 1, exemplary PLC system 100 is illustrated. As shown, PLC system 100 includes power line 104, which may be a conductor configured for electrical power transmission. According to PLC techniques known in the art, power line 104 may further be configured to carry data signals which may be received by or transmitted from devices connected to power line 104. In the illustrated example, power line 104 may be communicatively coupled to one or more devices 102A-N via communication links 112A-N respectively. Power line 104 may operate at mains voltage 108 and at mains frequency 106.

Communication links 112A-N may be implemented in several ways. In one example, one or more of communication links 112A-N may be ports or taps to couple respective devices 112A-N to power line 104. In other examples, one or more of communication links 112A-N may be configured as a net, wire, pilot cable, twisted pair, coaxial link, etc. Any suitable implementation or combination thereof may be adopted for communication links 112A-N in exemplary embodiments.

Coming now to devices 102A-N, these may be configured as modems, and more particularly, modems adapted for PLC, in exemplary embodiments. A typical modem or modulator-demodulator is an electronic device configured to modulate analog signals in order to encode digital data for transmission and demodulate analog signals to decode the transmitted data.

Figure 2A:
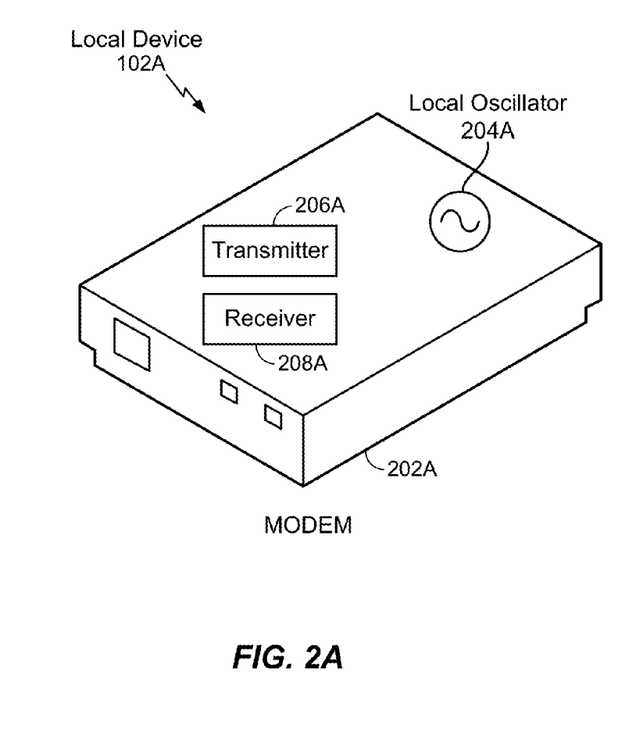
FIGS. 2A-B illustrate exemplary devices configured according to one or more exemplary embodiments.
Figure 2B:
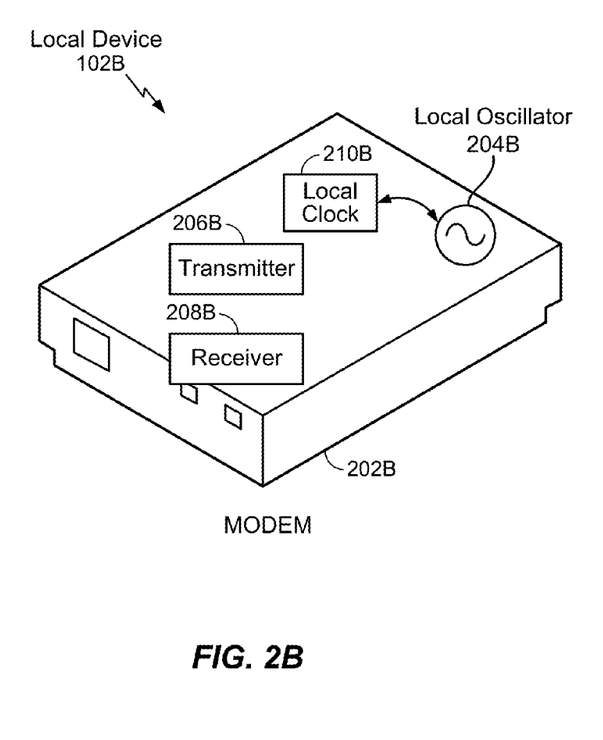

With reference to FIGS. 2A-B, exemplary implementations for devices 102A-N are depicted. In FIG. 2A, and without loss of generality, device 102A is shown to be configured as modem 202A. Modem 202A comprises local oscillator 204A, transmitter 206A, and receiver 208A. Similarly, in FIG. 2B, device 102B is shown to be configured as modem 202B, wherein modem 202B comprises local oscillator 204B, transmitter 206B, receiver 208B, and additionally, local clock 210B. Local oscillators 204A/204B generate clock signals based on implementations which can include a quartz-electric oscillator such as a voltage control oscillator (VCO), a temperature-compensated crystal oscillator (TCXO), or a global positioning system disciplined oscillator (GPSDO). Any other suitable implementation of local oscillators 204A/204B can be utilized in exemplary embodiments according to techniques described herein.

Figure 3:
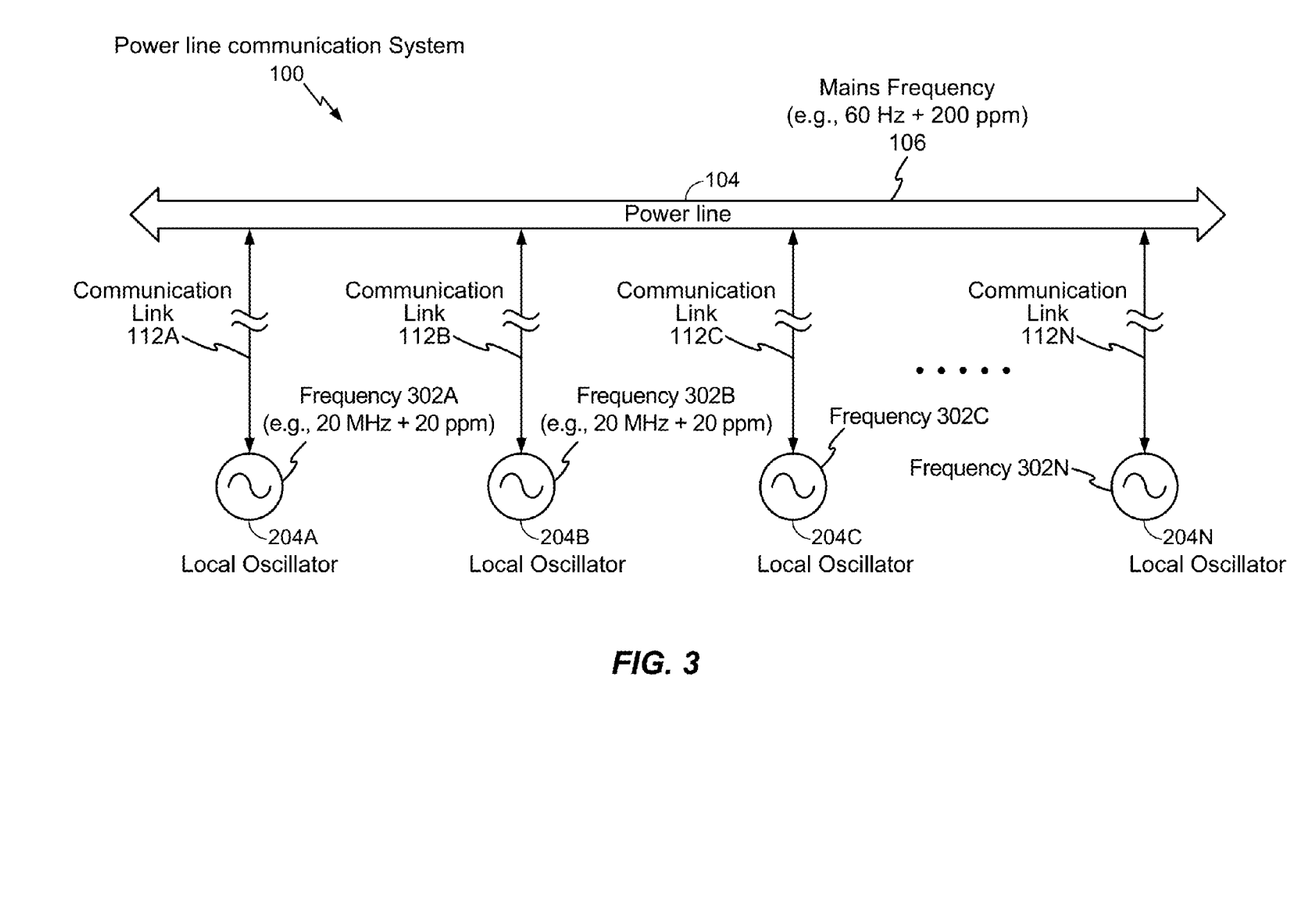
FIG. 3 illustrates local oscillators of exemplary devices and related illustrative frequencies along with illustrative mains frequency.

Turning now to FIG. 3, another view of PLC system 100 is depicted. In FIG. 3, devices 102A-N of FIG. 1, are replaced by corresponding local oscillators 204A-N. Exemplary oscillating frequencies 302A-N and mains frequency 106 are also depicted alongside corresponding local oscillators 204A-N and power line 104 respectively. While local oscillators 204A-N of devices 102A-N are ideally expected to produce frequency signals at mains frequency 106, the steady-state offset of individual local oscillators 204A-N can vary. Some oscillators 204A-N can run faster while some local oscillators 204A-N can run slower.

In the numerical example shown, mains frequency 106 of power line 104 may be 60 Hz and this frequency may have a variation of +/−200 ppm. Expected oscillating frequencies 302A-N of corresponding local oscillators 204A-N can be 20 MHz, but they may have variations of +/−20 ppm.

Accordingly, in one case, while frequency 302A can be 20 MHz with an error of +20 ppm, frequency 302B can be 20 MHz with an error of −20 ppm. As a result, the difference between frequency 302A and frequency 302B can be as high as 40 ppm. As previously mentioned, such large variations in frequency between local oscillators can unfavorably impact synchronization and therefore quality of communication of data signals in PLC system 100.

Accordingly, in exemplary embodiments, the deleterious effects of such large frequency variations are mitigated by synchronizing devices 102A-N with power line 104. In an exemplary method, mains frequency 106 is estimated at each device 102A-N. Estimation of mains frequency 106 can be relative to the corresponding frequency 302A-N of the corresponding local oscillator 204A-N. The estimated mains frequencies at devices 102A-N are respectively denoted herein as estimated mains frequencies 106'A-N. Exemplary techniques to calculate estimated mains frequencies 106'A-N will be discussed in the following sections, for example, with reference to FIGS. 6A-D. Regardless of how estimated mains frequencies 106'A-N are obtained, frequencies 302A-N may be adjusted or updated to in order to synchronize them to respective estimated mains frequencies 106'A-N. In this manner, synchronization of PLC system 100 is possible in exemplary embodiments.

As previously mentioned, power line 104 may carry data signals which may be transmitted and/or received by devices 102A-N. Accordingly, exemplary embodiments may further include techniques for synchronizing the data signals on power line 104 with devices 102A-N, for example, based on the respective differences between estimated mains frequencies 106'A-N and frequencies 302A-N of devices 102A-N. The following sections are directed to synchronization of data signals in PLC system 100, with reference for example, to FIGS. 4A-B and 5A-B.

Figure 4A:
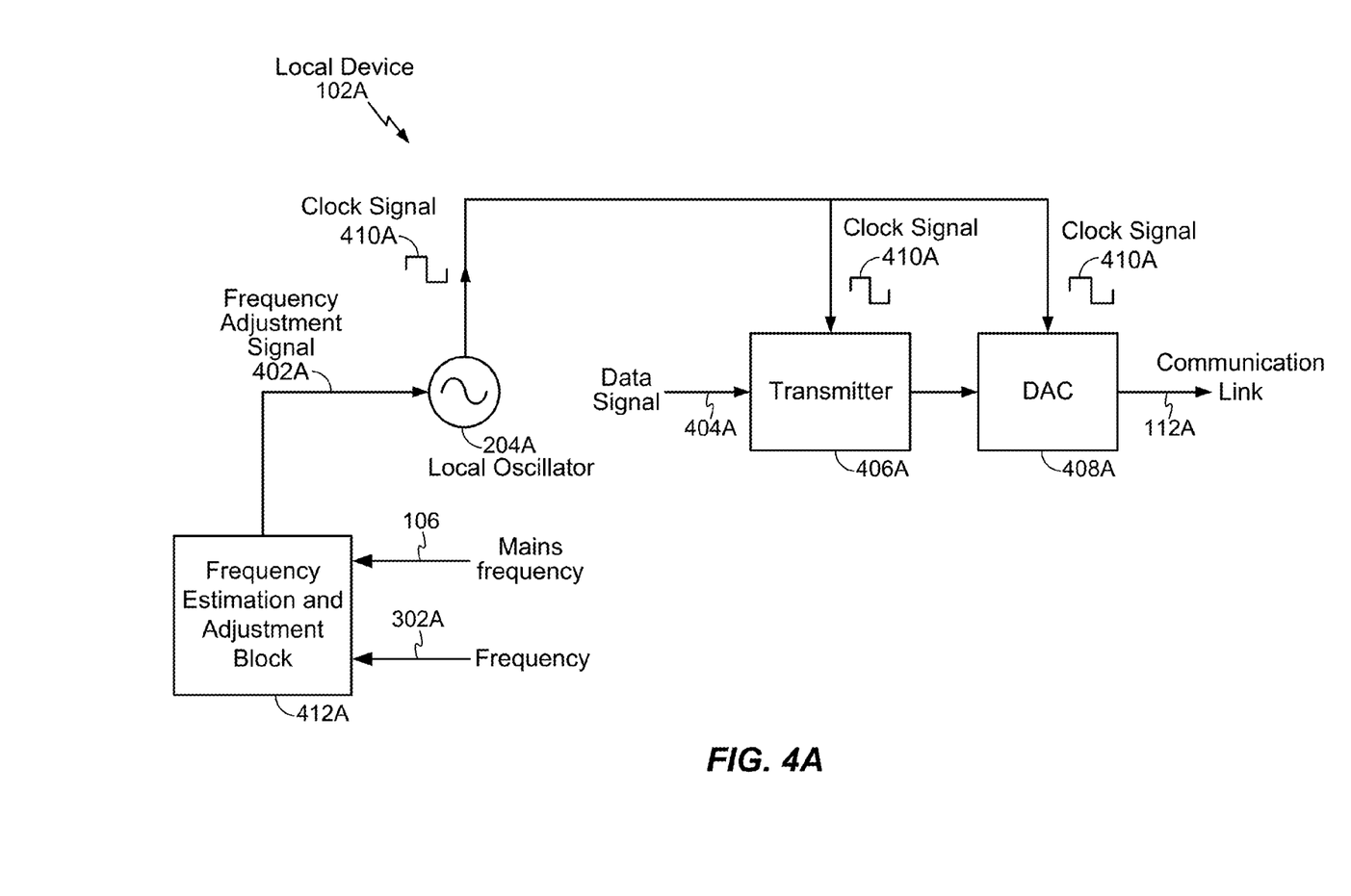
FIGS. 4A-B illustrate exemplary devices configured for transmitting synchronized data signals to a power line.

With reference first to FIG. 4A, an illustration of device 102A configured to transmit data signal 404A on power line 104 through communication link 112A is provided. Device 102A may include or be configured as a modem, such as modem 202A or 202B of FIGS. 2A-B, and configured to operate at frequency 302A based, for example, on local oscillator 204A. Device 102A may further include frequency estimation and adjustment block 412A, which may be configured estimate mains frequency 106 at Device 102A in order to obtain estimated mains frequency 106'A (not shown) and generate frequency adjustment signal 402A. Frequency adjustment signal 402A may be, for example, a difference between a multiple of estimated mains frequency 106'A and frequency 302A (since mains frequency 106 is typically in the order of 50 or 60 Hz, while frequencies of devices may magnitudes higher, such as, 20 MHz, a multiplication factor is applied to estimated mains frequency 106'A before calculating the difference between estimated mains frequency 106'A and frequency 302A). Frequency adjustment signal 402A, so obtained, may be fed to local oscillator 204A, based on which clock signal 410A may be generated. As seen, clock signal 410A represents a clock signal whose frequency has been adjusted based on frequency adjustment signal 402A and is therefore synchronized to mains frequency 106 of power line 104. Accordingly, transmitting data signal 404A based on clock signal 410A will serve to ensure that data signal 404A is synchronized to mains frequency 106, i.e. the frequency of operation of power line 104. To this end, clock signal 410A can also be provided to transmitter 406A which can ensure that the transmitted data signal 404A is correctly synchronized prior to transmission on to communication link 112A and subsequently to power line 104. Data signals need to be converted from digital signals transmitted by devices to analog signals prior to transmission on power lines. Accordingly, digital-to-analog converter (DAC) 408A converts digital data signal 404A to an analog signal, of frequency synchronized to mains frequency 106, prior to transmission to power line 104. DAC 408A may be supplied with clock signal 410A. Several implementations of DAC 408A are possible, and in various embodiments, DAC 408A may be configured as a pulse-width modulator, delta-sigma DAC, binary-weighted DAC, hybrid DAC, multiplying DAC, etc. Further, DAC 408 may be configured, for example, as a single bit DAC to reproduce two levels or a 12-bit DAC to reproduce 256 levels.

Figure 4B:
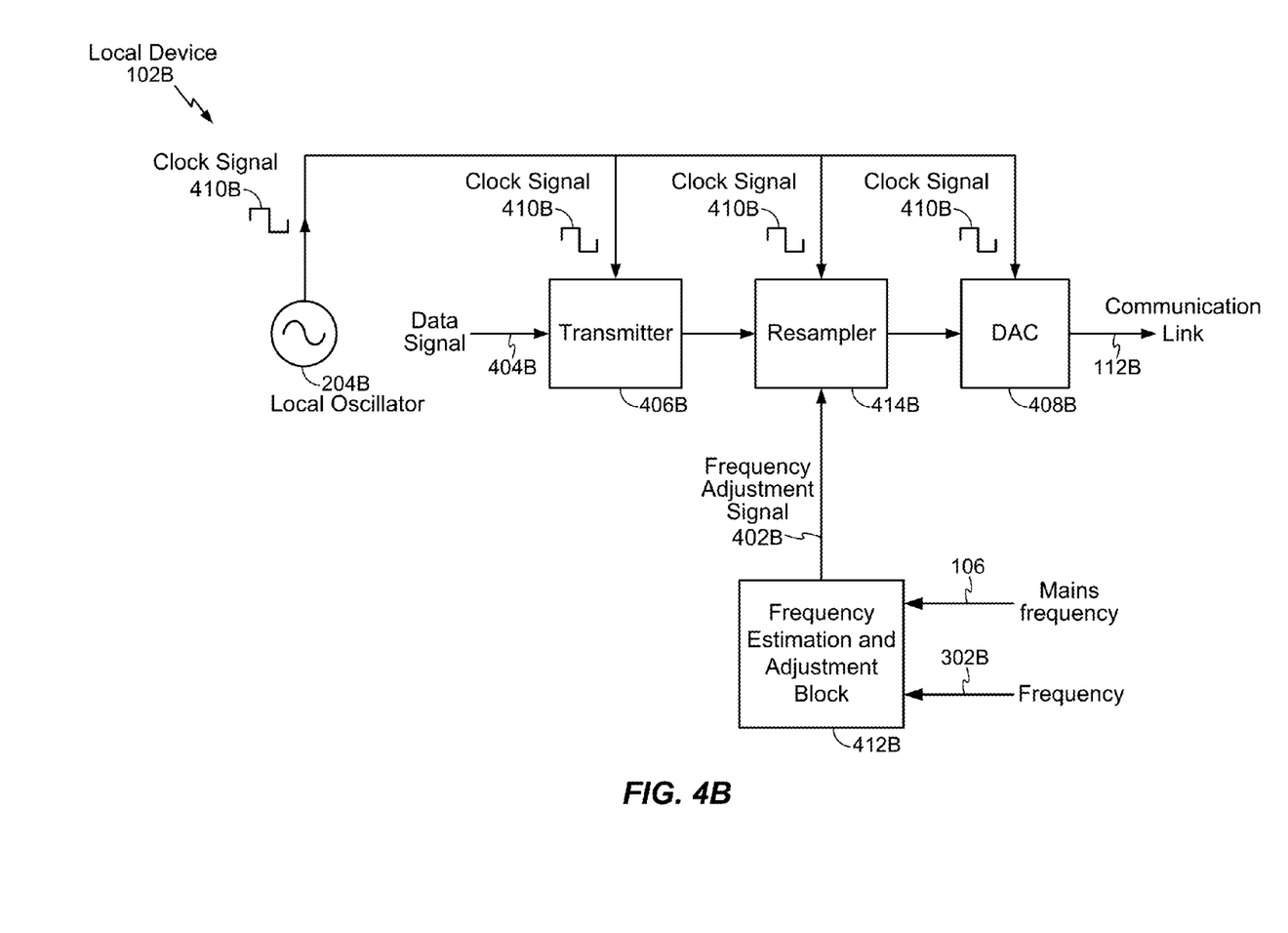

Referring now to FIG. 4B, an illustration of device 102B configured to transmit data signal 404B on power line 104 through communication link 112B is shown. Device 102B may include or be configured as a modem, such as modem 202A or 202B of FIGS. 2A-B, and may be configured to operate at frequency 302B based on local oscillator 204B. Device 102B may further include frequency estimation and adjustment block 412B, which may be configured to estimate the mains frequency 106 at device 102B to obtain estimated mains frequency 106'B (not shown) and generate frequency adjustment signal 402B. Frequency adjustment signal 402B may be, for example, a difference between a multiple of estimated mains frequency 106'B and frequency 302B. However, in contrast to local oscillator 204A of FIG. 4A, local oscillator 204B may remain unaltered by frequency adjustment signal 402B, such that clock signal 410B may be generated at the unaltered frequency 302B, and thereby, data signal 404B be may be transmitted from transmitter 406B based on clock signal 410B. On the other hand, resampler 414B may be provided in device 102B, wherein frequency adjustment signal 402B may be an input to resampler 414B. Based on frequency adjustment signal 402B, resampler 414B may resample data signal 404B provided by transmitter 406B, and accordingly, generate resampled data signals at a frequency that is synchronized to mains frequency 106. Implementation of DAC 408B may be similar to that of DAC 408A described above, wherein DAC 408B may also be supplied with clock signal 410B and configured to convert the resampled data signals to analog signals and output the analog signals on to communication link 112B for subsequent transmission on to power line 104.

While the above-described configurations of devices 102A-B in FIGS. 4A-B pertain to data transmission, embodiments may also include configurations of devices 102A-N directed to data reception. In this regard, embodiments pertaining to devices 102A-N which include, or are configured as, receivers will be described, for example, with regard to FIGS. 5A-B.

Figure 5A:
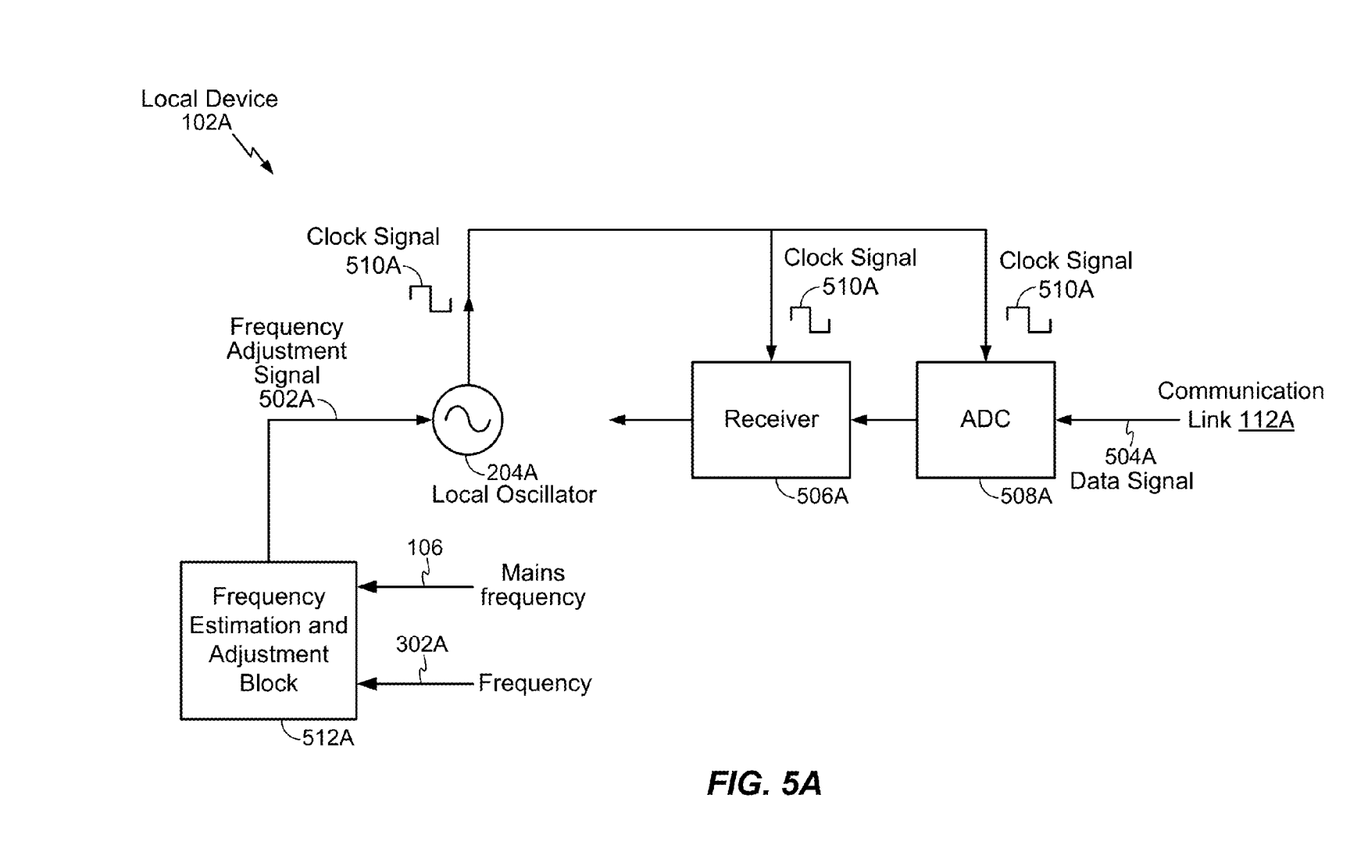
FIGS. 5A-B illustrate exemplary devices configured for receiving synchronized data signals from a power line

With reference to FIG. 5A, an illustration of device 102A configured to receive data signal 504A from power line 104 through communication link 112A is shown. Once again, device 102A may include or be configured as a modem, such as modem 202A or 202B of FIGS. 2A-B, and be configured to operate at frequency 302A based, for example, on local oscillator 204A. Device 102A may further include frequency estimation and adjustment block 512A, which may be configured estimate mains frequency 106 at device 102A to obtain estimated mains frequency 106'A (not shown) and generate frequency adjustment signal 502A. Frequency adjustment signal 502A may be, for example, a difference between frequency 302A and a multiple of estimated mains frequency 106'A. Frequency adjustment signal 502A, so obtained, may be input to local oscillator 204A, based on which clock signal 510A may be generated. As seen, clock signal 510A represents a clock signal whose frequency has been adjusted to be synchronized to mains frequency 106 of power line 104. Accordingly, received data signal 504A sampled based on clock signal 510A will serve to ensure that data signal 504A is synchronized to the frequency of operation of power line 104. To this end, clock signal 510A can be provided to analog-to-digital converter (ADC) 508A which may sample received analog data signal 504A at a rate supplied by clock signal 510A to generate a digital data signal that is synchronized at receiver 506A. Several implementations of ADC 508A are possible, and in exemplary embodiments, ADC 508A may be implemented as a flash ADC, successive-approximation ADC, integrating ADC, or time-stretch ADC (TS-ADC). Further, ADC 508 may be configured, for example, as a 12-bit ADC with high spurious free dynamic range (SFDR) and high effective number of bits (ENOB) in order to convert received data signal 504A to twelve bits of data.

Figure 5B:
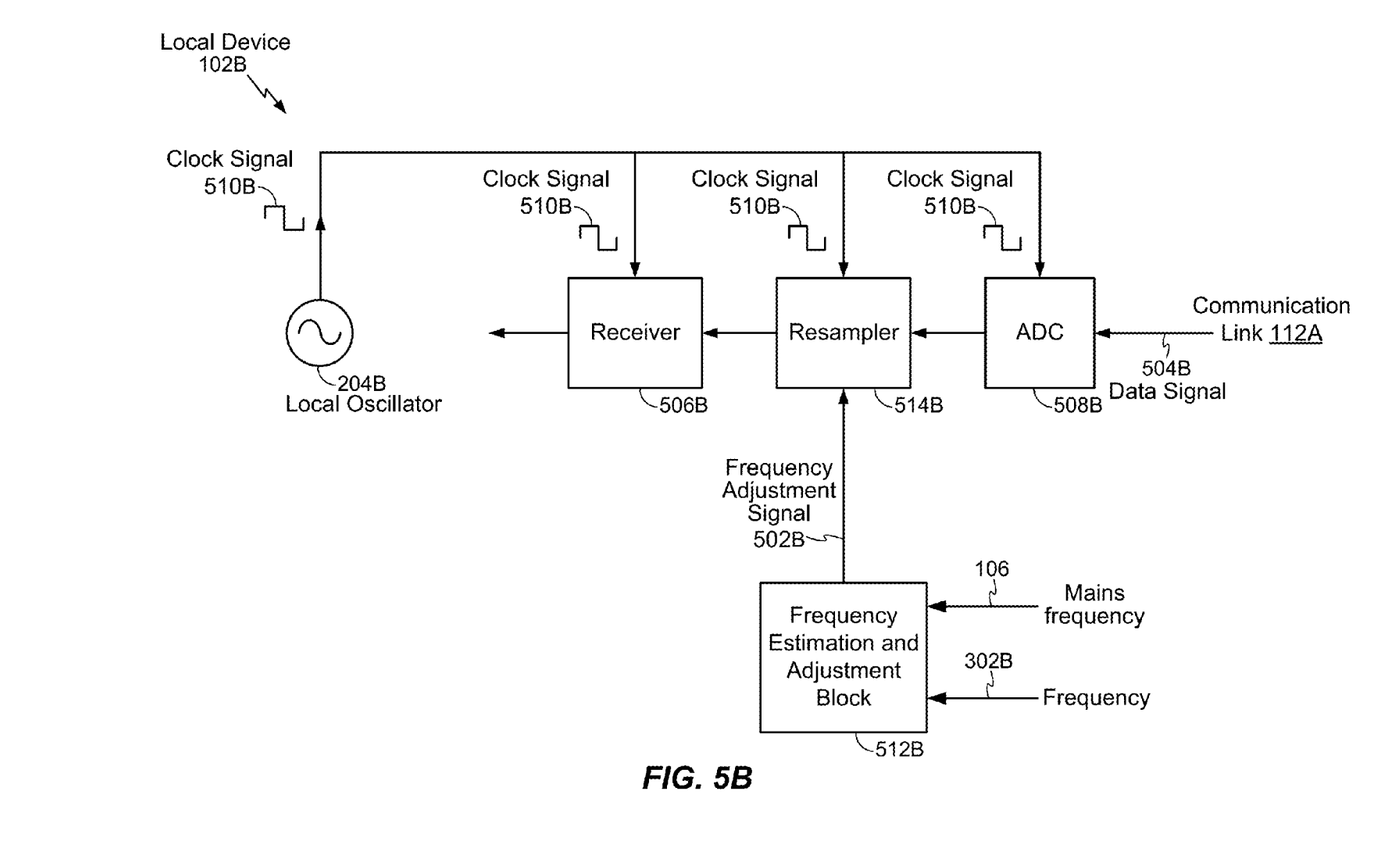

With reference to FIG. 5B an illustration of device 102B configured to receive data signal 504B from power line 104 through communication link 112B is provided. Once again, device 102B may include or be configured as a modem, such as modem 202A or 202B of FIGS. 2A-B, and may be configured to operate at frequency 302B based on local oscillator 204B. Device 102B may further include frequency estimation and adjustment block 512B, which may be configured estimate mains frequency 106 at device 102B to obtain estimated mains frequency 106'B (not shown) and generate frequency adjustment signal 502B. Frequency adjustment signal 402B may be, for example, a difference between frequency 302B and a multiple of estimated mains frequency 106'B. However, in contrast to local oscillator 204A of FIG. 5A above, local oscillator 204B may remain unaltered by frequency adjustment signal 502B such that clock signal 510B may be generated at the unaltered frequency 302B. On the other hand, resampler 514B provided in device 102B may take care of frequency adjustment required for synchronization of device 102B with mains frequency 106. Accordingly, frequency adjustment signal 502B may be fed into resampler 514B and resampler 514B may thereby resample data signal 504B received from ADC 508B based on frequency adjustment signal 502B, in order to generate resampled data signals at a frequency that is synchronized with mains frequency 106. Receiver 506B may be configured to receive digital data signals which have now been synchronized. ADC 508B (which may be similar to ADC 508A) may be based on clock signal 510B and configured to convert received analog data signal 504B from communication link 112B at mains frequency 106 into digital signals at frequency 302B of device 102B.

As previously noted with regard to data transmission, configurations of power line communication system 100 may be possible wherein a common frequency estimation and adjustment block may be provided for frequency adjustment pertaining to data reception as well. Moreover, each device 102A-N may be configured for both transmission, as well as, reception, and therefore, even in the described embodiments with individual frequency estimation and adjustment blocks provided in each device, these individual blocks may perform the described functions both for transmission and reception. In other words, device 102A may combine frequency estimation and adjustment blocks 412A and 512A of FIGS. 4A and 5A into a same logic block, or a common frequency estimation and adjustment block (not shown) may be provided to both the receiver and transmitter components of the devices. Alternative configurations and suitable variations can be recognized by one skilled in the art without departing from the scope of the embodiments.

Moreover, in the above-described implementations, each of the devices 102A-N may include respective frequency estimation and adjustment blocks, which may be combined for transmitter and receiver functions, wherein respective frequency estimation and adjustment blocks receive mains frequency 106 and corresponding local frequency 302A-B and output frequency adjustment signals 402A-B. In alternative configurations of exemplary PLC systems, it may be possible to have a common frequency estimation and adjustment block (not illustrated) which can perform similar functions to generate individual frequency adjustment signals for use in each device. While such configurations are not described in detail herein, skilled persons will be able to recognize suitable implementations for such common frequency estimation and adjustment which can beneficially enable reuse or sharing of resources and thereby lower costs.

Figure 6A:
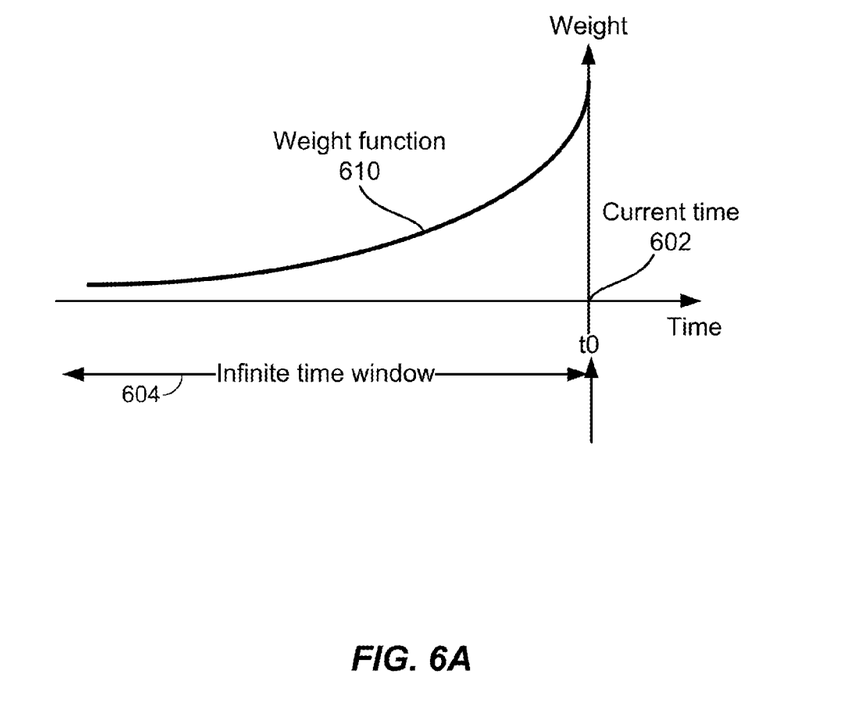
FIGS. 6A-D illustrate estimation of mains frequency relative to frequency of a device according to an exemplary embodiment.
Figure 6B:
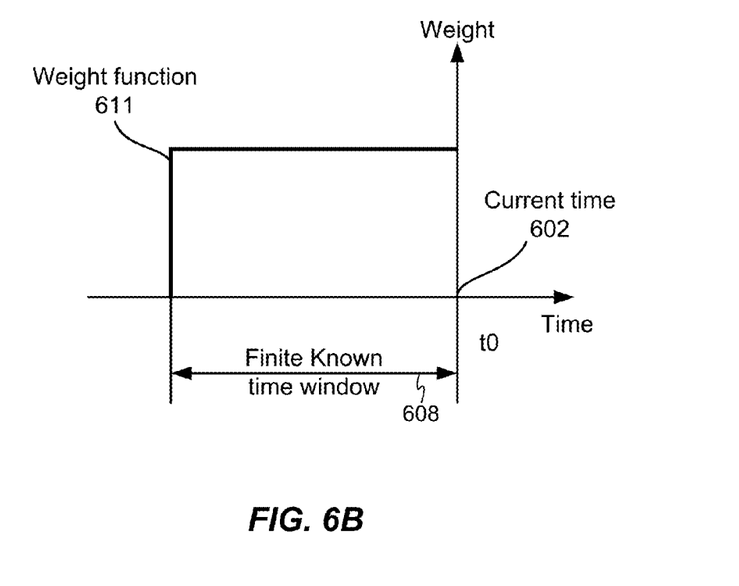

Turning now to FIGS. 6A-B, aforementioned techniques for estimating mains frequency 106' and corresponding frequency adjustment for synchronization at devices in exemplary PLC systems will now be described. For example, in frequency estimation and adjustment blocks 412A/512A of device 102A, mains frequency 106'A may be estimated by measuring the time between successive zero-crossings of signals carried on power line 104, also known as, the mains signals. As an alternative implementation, frequency estimation methods may be applied using digital or analog signal processing to estimate the mains frequency. As previously noted, mains frequency 106 may fluctuate or vary, for example, with an offset of +/−200 ppm. As a consequence, estimated frequency 106'A may correspondingly vary, depending upon when the estimation is performed. In order to minimize variations in estimated frequency 106'A, device 102A can estimate the mains frequency several times and at different instances of time. An averaging function may then be applied to the several estimates or samples obtained at different time instances in order to obtain a frequency estimate at a current point in time.

More specifically, as shown in FIG. 6A, frequency estimations of mains frequency 106 may be performed, for example, in device 102A, at several time instances in a theoretically infinite time window 604 prior to current time 602 (also depicted as $t_0$). An averaging weight is applied to the frequency estimations or samples obtained during the infinite time window 604. In FIG. 6A, weight function 610 is in the form of an exponential curve whose value tends to zero as time instances tend towards the past (or theoretically, negative infinity), and the weight is preferentially higher towards more recent samples (with the highest weight at current time 602 ($t_0$). This exponential weight function 610 in FIG. 6A serves the function of assigning more importance to more recent samples, and less importance to samples in the distant past. In one example, exponential weight function 610 can be implemented by accumulating samples in the past to obtain a cumulative sum, multiplying the cumulative sum with a coefficient, and adding the result or product of the multiplication to the cumulative sum. The coefficient is typically less than 1 for exponential weight functions, and is also known as a forgetting factor.

Figure 6C:
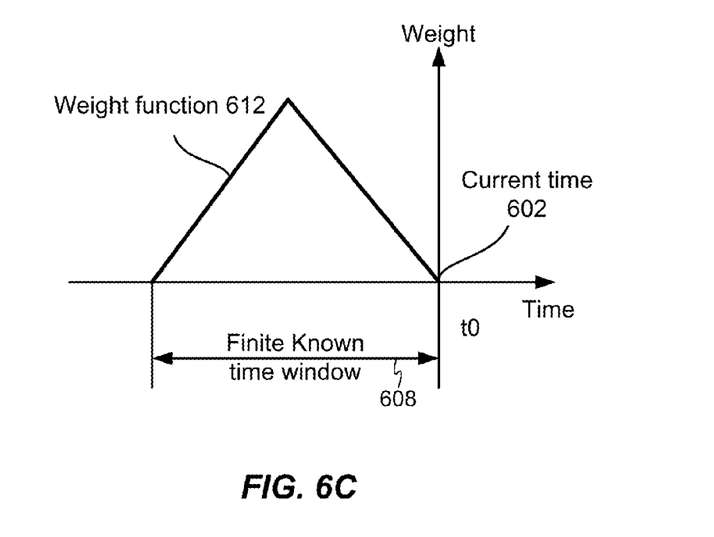

With reference to FIGS. 6B-C, alternative weight functions are illustrated. In FIGS. 6B-C, the weight functions are applied to samples obtained over a finite or known time period 608. With reference to FIG. 6B, weight function 611 is a rectangular or square function, which serves the purpose of assigning equal weight to all the samples obtained in known time period 608. On the other hand, FIG. 6C depicts weight function 612 in the form of a triangular wave, which applies varying weight over samples obtained in known time period 608. More specifically, weight function 612 selectively applies high weights to samples at a certain predetermined time in the recent past, with the weight tapering away towards both ends of known time period 608, with a weight of zero assigned to current time 602 ($t_o$) and the most distant time in the past in known time period 608. Any of weight functions 610, 611, or 612 or any suitable variation or combination thereof may be used in exemplary embodiments for obtaining estimated mains frequency 106'A.

Figure 6D:
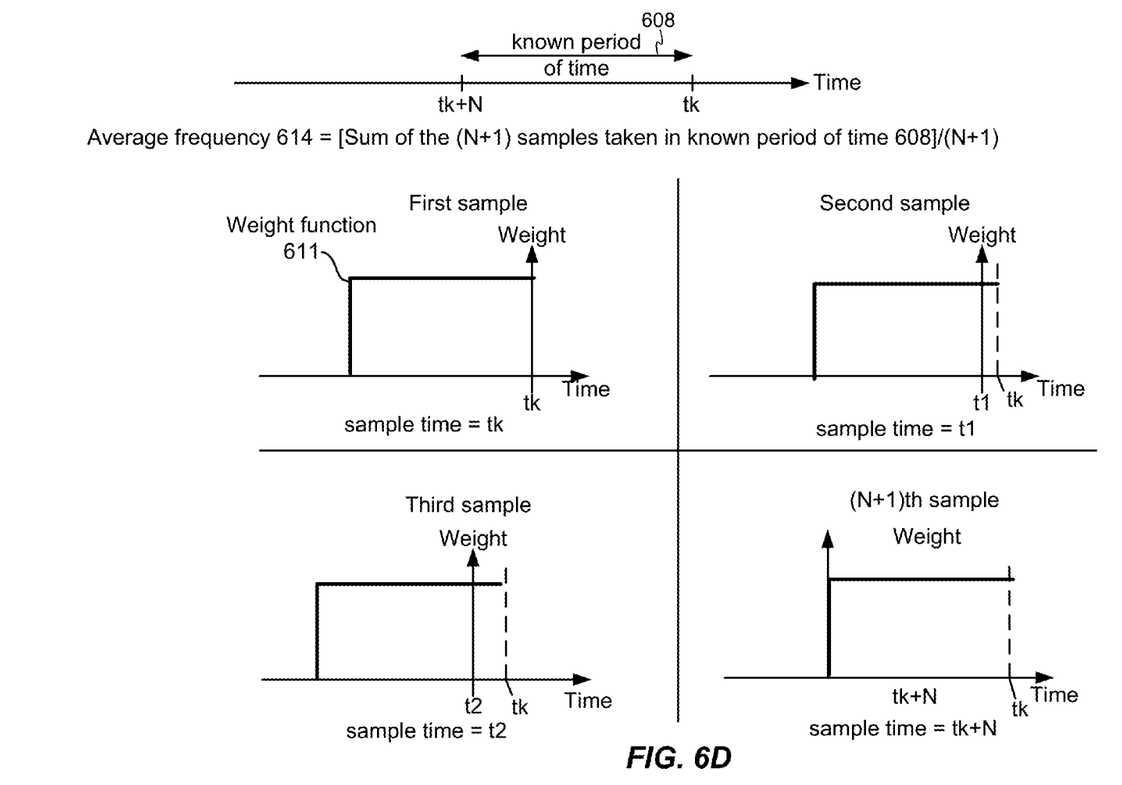

Referring to FIG. 6D, a more detailed example pertaining to estimating mains frequency 106, for example, at device 102A, based on square weight function 611 is illustrated. Known time period 608 is shown as spanning N+1 samples between two generalized points in time, $t_k$ and $t_{k+N}$. As shown, a first sample of mains frequency 106 (e.g. by counting zero-crossings) may be obtained at time $t_k$, a second sample at time $t_1$, a third sample at time $t_2$, and an (N+1)th sample at time $t_{k+N}$. All (N+1) samples may be weighted equally, based on the square weight function 611 (it will be recalled that exponential weight function 610, triangular weight function 612, or any alternative or combination thereof can replace square weight function 611 in alternative embodiments). Average frequency 614 may then be estimated by summing up the (N+1) samples and dividing it by (N+1). Accordingly, in this example, estimated mains frequency 106'A at device 102A will be provided by average frequency 614. It will be understood that estimated mains frequency 106'B at device 102B, and more generally, estimated mains frequencies 106'A-N in devices 102A-N can be similarly obtained by obtaining a number of samples of mains frequency 106 (e.g. based on counting zero-crossings) at the devices 102A-N, weighting the samples with a weight function (e.g. exponential weight function 610, square weight function 611, triangular weight function 612, etc.), and calculating an average of the weighted samples.

Moreover, as previously mentioned, once estimated mains frequencies 106'A-N are calculated at devices 102A-N, frequency adjustment signals (e.g. frequency adjustment signals 402A-B and 502A-B in FIGS. 4A-B and 5A-B) can be obtained as a difference between a suitable multiple of corresponding estimated mains frequency 106'A-N and local frequency 302A-N. The suitable multiple, or multiplication factor, can be simply obtained in some embodiments based on known steady state expected frequencies. For example, if the expected steady state frequency of power line 104, i.e. mains frequency 106, is 50 Hz and the expected steady state frequency of device 102A is 20 MHz, then the multiplication factor would be 20 MHz/50 Hz=400. More accurate multiplication factors may be obtained for example, based on information derived from a history of samples related to estimated mains frequency 106' at individual devices 102A-N.

Figure 7:
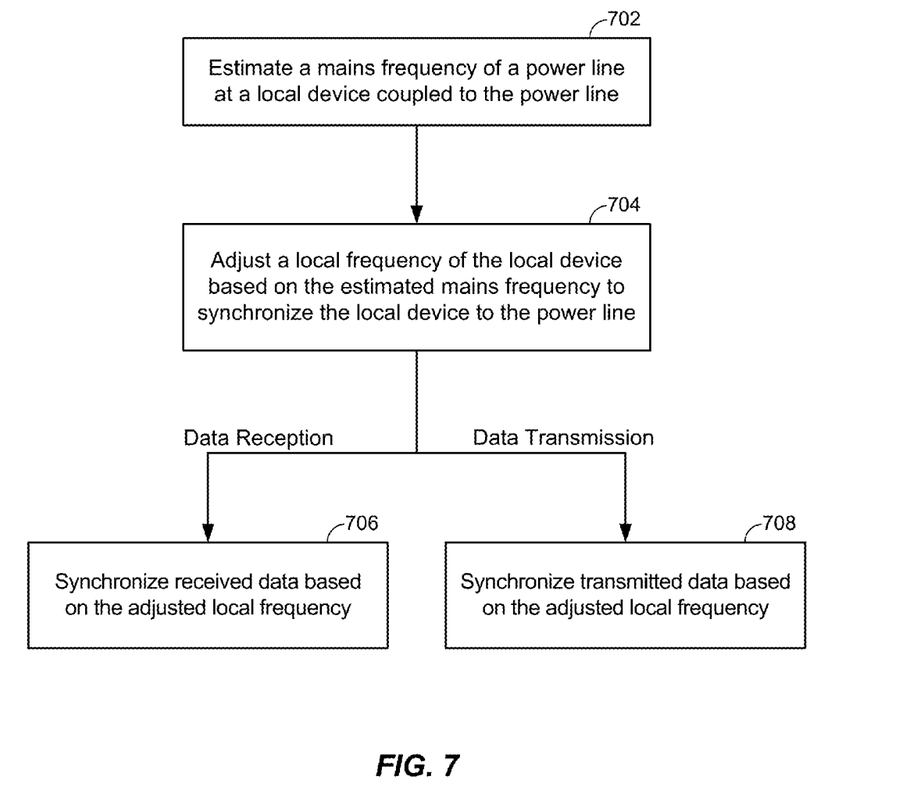
FIG. 7 illustrates a flow diagram for an exemplary power line communication system synchronization method.

It will be appreciated that embodiments include various methods for performing the processes, functions and/or algorithms disclosed herein. For example, as illustrated in FIG. 7, an embodiment can include a method of synchronizing a power line communication system, the method comprising: estimating a mains frequency of a power line at a device coupled to the power line (e.g. obtaining estimated mains frequency 106'A at device 102A per FIG. 6D)—Block 702; and adjusting a local frequency of the device based on the estimated mains frequency to synchronize the device to the power line (e.g. by obtaining frequency adjustment signal 402A/502A to adjust local oscillator 204A, based on a corresponding comparison of a multiple of estimated mains frequency 106'A and local frequency 302A)—Block 704. Additionally, in some embodiments, the method can further include synchronizing received data at the device based on the adjusted local frequency in the case of data reception (e.g. at receiver 506A using clock signal 510A derived from local oscillator 204A and adjusted based on adjustment signal 502A)—Block 706; and/or synchronizing data transmitted from the device based on the adjusted local frequency in the case of data transmission (e.g. at transmitter 406A using clock signal 410A derived from local oscillator 204A and adjusted based on adjustment signal 402A)—Block 708.

Figure 8:
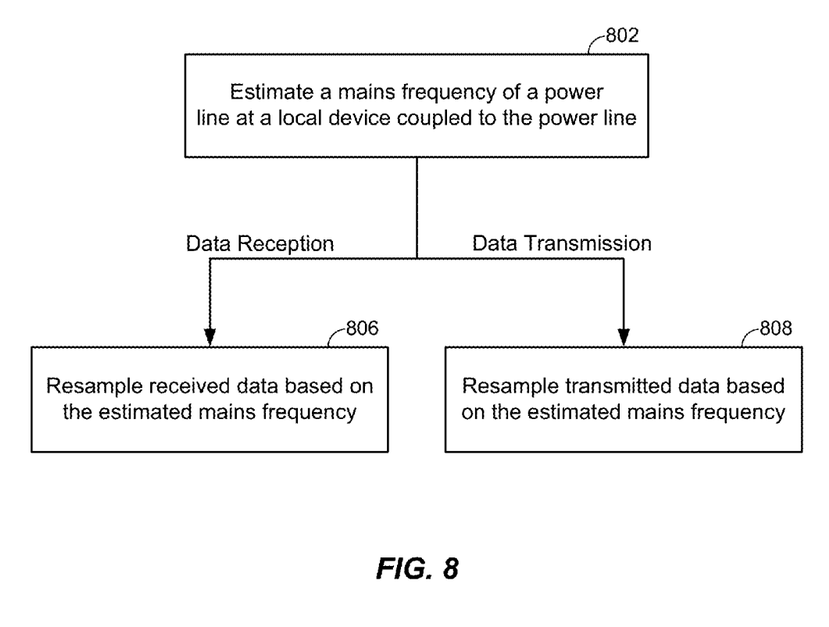
FIG. 8 illustrates a flow diagram for another exemplary power line communication system synchronization method.

With reference to FIG. 8, another method relating to synchronizing a power line communication system is illustrated, the method comprising: estimating a mains frequency of a power line at a device coupled to the power line (e.g. obtaining estimated mains frequency 106'B at device 102B)—Block 802; in the case of data reception, resampling received based on the estimated mains frequency (e.g. at resampler 514B, based on frequency adjustment signal 502B calculated from estimated mains frequency 106'B and frequency 302B)—Block 806; and/or, in the case of data transmission, synchronizing data transmitted from the device based on the adjusted local frequency (e.g. at resampler 414B, based on frequency adjustment signal 402B calculated from estimated mains frequency 106'B and frequency 302B)—Block 808.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a power line communication system synchronization method. Accordingly, the invention is not limited to illustrated examples and any means for performing the functionality described herein are included in embodiments of the invention.

What is claimed is:

1. A method of synchronizing a power line communication system, the method comprising:
sampling a mains frequency of a power line at a device coupled to the power line, wherein the mains frequency is lower than a local frequency of the device;
determining an estimated mains frequency at the device based on the sampling; and
adjusting the local frequency of the device based on a difference between a multiple of the estimated mains frequency and the local frequency, to synchronize the device to the power line, wherein the multiple is greater than one; and one or more of:
resampling data based on the adjusted local frequency prior to transmitting data on to the power line at the adjusted local frequency; or
receiving data from the power line at the adjusted local frequency and resampling the received data based on the adjusted local frequency.

2. The method of claim 1, wherein the sampling comprises obtaining a number of samples of the mains frequency at the device, weighting the samples with a weight function, and calculating an average of the weighted samples.

3. The method of claim 2, wherein the weight function is one of an exponential weight function, square weight function, and a triangular weight function.

4. A power line communication system comprising:
a power line;
a communication link;
a device coupled to the power line through the communication link, wherein the device comprises logic configured to:
sample a mains frequency of the power line, wherein the mains frequency is lower than a local frequency of the device;
determine an estimated mains frequency based on samples of the mains frequency; and
adjust the local frequency of the device based on a difference between a multiple of the estimated mains frequency and the local frequency, wherein the multiple is greater than one;
wherein the device comprises:
a frequency estimation and adjustment block configured to provide an adjustment signal based on the adjusted local frequency to a resampler, and one or more of a transmitter or a receiver, wherein the:
transmitter is configured to transmit data on to the power line at the adjusted local frequency, wherein the resampler is configured to resample data based on the adjustment signal prior to transmission to the power line; and
the receiver is configured to receive data from the power line at the adjusted local frequency, wherein the resampler is configured to resample received data based on the adjustment signal, wherein the multiple is greater than one.

5. The power line communication system of claim 4, wherein the device is configured to count zero crossings of signals from the power line to obtain a number of samples of the mains frequency at the device, weight the samples with a weight function, and calculate an average of the weighted samples.

6. The power line communication system of claim 5, wherein the weight function is one of an exponential weight function, square weight function, and a triangular weight function.

7. A power line communication system comprising:
a power line;
a device coupled to the power line through communication means;
means for sampling a mains frequency of the power line at the device, wherein the mains frequency is lower than a local frequency of the device;
means for determining an estimated mains frequency at the device based on the sampling; and
means for adjusting the local frequency of the device based on a difference between a multiple of the estimated mains frequency and the local frequency, wherein the multiple is greater than one;
wherein the device comprises one or more of a:
means for resampling data based on the adjusted local frequency prior to transmitting data on to the power line at the adjusted local frequency; or
means for receiving data from the power line at the adjusted local frequency and resampling the received data based on the adjusted local frequency.

8. The power line communication system of claim 7, comprising means for obtaining a number of samples of the mains frequency at the device, means for weighting the samples with a weight function, and means for calculating an average of the weighted samples.

9. A non-transitory computer-readable storage medium comprising code, which, when executed by a processor, causes the processor to perform operations for synchronizing a power line communication system, the non-transitory computer-readable storage medium comprising:
code for sampling a mains frequency of a power line at a device coupled to the power line, wherein the mains frequency is lower than a local frequency of the device;
code for determining an estimated mains frequency at the device based on the sampling; and
code for adjusting the local frequency of the device based on a difference between a multiple of the estimated mains frequency and the local frequency, to synchronize the device to the power line, wherein the multiple is greater than one; and one or more of:
code for resampling data based on the adjusted local frequency prior to transmitting data on to the power line at the adjusted local frequency; or
code for receiving data from the power line at the adjusted local frequency and resampling the received data based on the adjusted local frequency.

* * * * *